US009223556B2

(12) United States Patent
Tian (10) Patent No.: US 9,223,556 B2
(45) Date of Patent: *Dec. 29, 2015

(54) SOFTWARE DOWNLOAD METHOD AND APPARATUS

(71) Applicant: Huawei Technologies Co., Ltd., Shenzhen, Guangdong (CN)

(72) Inventor: Linyi Tian, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 14/548,009

(22) Filed: Nov. 19, 2014

(65) Prior Publication Data

US 2015/0081872 A1    Mar. 19, 2015

Related U.S. Application Data

(63) Continuation of application No. 13/928,599, filed on Jun. 27, 2013, now Pat. No. 8,909,755, which is a continuation of application No. PCT/CN2011/085134, filed on Dec. 31, 2011.

(30) Foreign Application Priority Data

Dec. 31, 2010  (CN) .......................... 2010 1 0620634

(51) Int. Cl.
   *G06F 15/173*   (2006.01)
   *G06F 9/445*    (2006.01)
   (Continued)

(52) U.S. Cl.
   CPC ............... *G06F 8/60* (2013.01); *H04L 41/082* (2013.01); *H04L 61/00* (2013.01); *H04L 67/34* (2013.01);
   (Continued)

(58) Field of Classification Search
   None
   See application file for complete search history.

(56) References Cited

U.S. PATENT DOCUMENTS 8,909,755 B2 * 12/2014 Tian .............................. 709/223
2008/0028046 A1   1/2008 Ushiki
(Continued)

FOREIGN PATENT DOCUMENTS

CN    101119517 A    2/2008
CN    101325509 A    12/2008
(Continued)

OTHER PUBLICATIONS

Seungkyu Park, et al., "Image Inventory MO Baseline", Open Mobile Alliance Ltd., Dec. 14, 2010, 4 pages.
(Continued)

*Primary Examiner* — John B Walsh (57) ABSTRACT

Embodiments of the present invention disclose a software download method and apparatus. The method includes: acquiring a fanout command and a replacement instruction delivered by a device management server, and replacing, according to the replacement instruction, a software identifier in the fanout command with a software local download address generated for software; delivering the converted fanout command to each terminal corresponding to the fanout command, so that each terminal downloads the software according to the software local download address. The present invention further provides another software download method and software download apparatus. In the embodiments, multiple terminals can be effectively prevented from retrieving data externally, and a local storage function provided by a device management gateway is used to directly acquire download data of the software from a local network of the device management gateway, thereby significantly improving the efficiency.

10 Claims, 6 Drawing Sheets

(51) Int. Cl.
*H04L 12/24* (2006.01)
*H04W 4/00* (2009.01)
*H04L 29/12* (2006.01)
H04L 29/08 (2006.01)
H04W 4/08 (2009.01)
H04W 4/18 (2009.01)

(52) U.S. Cl.
CPC .............. *H04W 4/001* (2013.01); *H04L 67/125* (2013.01); *H04L 67/28* (2013.01); *H04W 4/08* (2013.01); *H04W 4/18* (2013.01)

(56) References Cited

U.S. PATENT DOCUMENTS

| | | |
|---|---|---|
| 2009/0043784 A1 | 2/2009 | Carro |
| 2009/0043815 A1 | 2/2009 | Lee et al. |
| 2009/0222793 A1 | 9/2009 | Frank et al. |
| 2011/0093743 A1* | 4/2011 | Arcese et al. .................. 714/18 |
| 2012/0079093 A1 | 3/2012 | Zhang et al. |
| 2013/0046807 A1 | 2/2013 | Sakata et al. |
| 2013/0290566 A1 | 10/2013 | Tian |
| 2014/0137103 A1 | 5/2014 | Cui et al. |

FOREIGN PATENT DOCUMENTS

| | | |
|---|---|---|
| CN | 101924645 A | 12/2010 |
| CN | 102136942 A | 7/2011 |
| EP | 2 424 162 A1 | 2/2012 |

OTHER PUBLICATIONS

Seungkyu Park, et al., "Image Distribution using Image Inventory MO", Open Mobile Alliance Ltd., Jan. 31, 2011, 6 pages.

\* cited by examiner

SOFTWARE DOWNLOAD METHOD AND APPARATUS

CROSS-REFERENCE TO RELATED APPLICATIONS

This application is a continuation of U.S. application Ser. No. 13/928,599, filed on Jun. 27, 2013, which is a continuation of international Application No. PCT/CN2011/085134, filed on Dec. 31, 2011. The International Application claims priority to Chinese Patent Application No. 201010620634.9, filed on Dec. 31, 2010. The afore-mentioned patent applications are hereby incorporated by reference in their entireties.

TECHNICAL FIELD

The present invention relates to the field of communications technologies, and in particular, to a software download method and apparatus.

BACKGROUND

As a service activation standard of an open mobile architecture (Open Mobile Architecture, called OMA for short in the following), a software component management object (Software Component Management Object, called SCOMO for short in the following) allows a corresponding management authority to remotely send and manage software, such as an application and a library, on each connected device. The software can be delivered to a terminal through a device management (Device Management, called DM for short in the following) download mode and a non-DM download mode. The DM download mode is that a server directly delivers a software package to a data (Date) node for saving, by using a replace (Replace) command. The non-DM download mode is that, after a server triggers a download operation in an operation (Operation) sub-tree, the terminal directly utilizes an address indicated by a download address (PkgURL) to download the software. Definitely, the software described in the present invention also includes an ordinary software component.

After a terminal becomes a member of a terminal list managed by a gateway, a DM session needs to be relayed by the gateway, and a fanout (Fanout) mechanism needs to be used when a device fanout command is sent to multiple terminals simultaneously, where a Fanout management object (Management Object, called MO for short in the following) is saved in the gateway. When the multiple terminals use the same software, the gateway can provide a local storage function, where the server delivers data to the gateway first to enable the terminal to acquire the data from the gateway.

During implementation of the present invention, the inventor finds that the prior art at least has the following technical problems: when a terminal acquires the data from a gateway, the gateway in the prior art does not parse a DM command in a fanout command (FanoutCommands) saved locally, but only places the DM command into a new DM message and sends the new DM message to the terminal, so that the terminal is unable to directly acquire the data saved in the gateway, according to a software identifier (ImageID) or a software download address (ImageURL) in the fanout command, and the terminal still needs to download the data from a remote server, thereby wasting the bandwidth and reducing the efficiency. Especially, in some scenarios, the terminal does not have a capability of connecting to an external network, and is unable to download the data from the remote server, so that the objective of managing a device cannot be achieved.

SUMMARY

Embodiments of the present invention provide a software download method and apparatus, so as to prevent a terminal from directly downloading software from a remote server, ensure that a terminal incapable of connecting to an external network can be managed, and improve the efficiency.

In order to achieve the objective, an embodiment of the present invention provides a software download method, which includes:

acquiring a fanout command and a replacement instruction that are delivered by a device management server, and replacing, according to the replacement instruction, a software identifier in the fanout command with a software local download address generated for software; and delivering the converted fanout command to each corresponding terminal, so that each terminal downloads the software according to the software local download address.

An embodiment of the present invention provides another software download method, which includes:

acquiring a fanout command delivered by a device management server, where the fanout command carries a software local download address generated for software; and delivering the fanout command to each corresponding terminal, so that each terminal downloads the software according to the software local download address.

An embodiment of the present invention provides a software download apparatus, which includes:

a conversion module, configured to acquire a fanout command and a replacement instruction that are delivered by a device management server, and replace, according to the replacement instruction, a software identifier in the fanout command with a software local download address generated for software; and a first download module, configured to deliver the converted fanout command to each corresponding terminal, so that each terminal downloads the software according to the software local download address.

An embodiment of the present invention provides another software download apparatus, which includes:

an acquisition module, configured to acquire a fanout command delivered by a device management server, where the fanout command carries a software local download address generated for software; and a second download module, configured to deliver the fanout command to each corresponding terminal, so that each terminal downloads the software according to the software local download address.

In the software download method and apparatus provided by the embodiments of the present invention, a new software local download address is allocated to the software, so that each terminal can download data of the software from a local network according to the software local download address, so as to efficiently prevent multiple terminals from directly retrieving data externally, and utilize a local storage function provided by a device management gateway to directly acquire download data of the software from the local network, thereby significantly improving the efficiency. Particularly, in a situation that some internal network terminals are unable to access an external network, successful management on terminal devices can also be ensured.

BRIEF DESCRIPTION OF THE DRAWINGS

To illustrate the technical solutions in the embodiments of the present invention or in the prior art more clearly, the following briefly describes the accompanying drawings required for describing the embodiments or the prior art. Apparently, the accompanying drawings in the following description show some embodiments of the present invention, and persons of ordinary skill in the art can derive other drawings from these accompanying drawings without creative efforts.

DETAILED DESCRIPTION

To make the objectives, technical solutions, and advantages of the present invention more comprehensible, the following clearly and completely describes the technical solutions according to the embodiments of the present invention with reference to the accompanying drawings in the embodiments of the present invention. Apparently, the embodiments in the following description are merely a part rather than all of the embodiments of the present invention. All other embodiments obtained by persons of ordinary skill in the art based on the embodiments of the present invention without creative efforts shall fall within the protection scope of the present invention.

Figure 1:
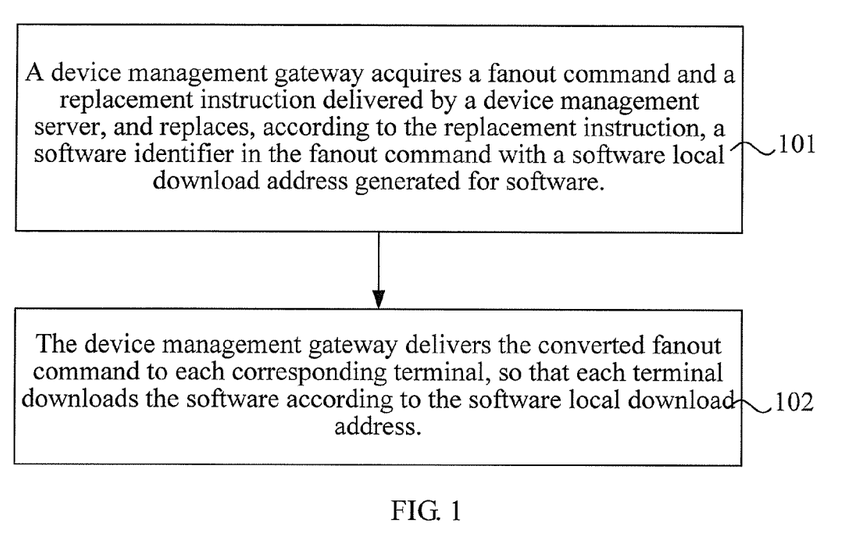
FIG. 1 is a flow chart of Embodiment 1 of a software download method of the present invention.

FIG. 1 is a flow chart of Embodiment 1 of a software download method of the present invention. As shown in FIG. 1, this embodiment provides a software download method. This embodiment is directed to a situation that a device management gateway is used as a relay management device between a device management server and a terminal. This embodiment may specifically include the following steps.

Step 101: A device management gateway acquires a fanout command and a replacement instruction that are delivered by a device management server, and replaces, according to the replacement instruction, a software identifier in the fanout command with a software local download address generated for software.

In this embodiment, in addition to the fanout command, the device management server DM Server also delivers the replacement instruction to the device management gateway (DM Gateway). The replacement instruction can be delivered to a fanout management sub-tree of the device management gateway and the fanout command can be delivered to a fanout management sub-tree of the device management gateway in the same manner, where the acquired fanout command carries the software identifier. After the device management gateway receives, from the management server, a request of executing the fanout command, the device management gateway performs conversion processing on the fanout command according to the replacement instruction, that is, replaces the software identifier in the fanout command with the software local download address (LocalImageURL), where the software local download address is an actual download address that is in a local network of the device management gateway and is allocated to the software by the device management gateway according to the software identifier. The software in this embodiment may be any data that can be downloaded, such as firmware, an application, a library file and an image file. In this embodiment, the software local download address generated for the software may be a local storage address of the device management gateway, and may also be an address of another storage server in the local network of the device management gateway.

In each embodiment of the present invention, the device management server may also deliver a target terminal group identifier or a target terminal list used to indicate each terminal corresponding to the fanout command, where the target terminal group identifier or the target terminal list may be delivered through the fanout command, and may also be delivered alone by the DM server.

Step 102: The device management gateway delivers the converted fanout command to each corresponding terminal, so that each terminal downloads the software according to the software local download address.

After performing the conversion processing on the acquired fanout command, the device management gateway delivers the converted fanout command to each corresponding terminal, so that each terminal can download the software according to the software local download address carried in the converted fanout command without directly accessing the device management server in a network.

With the software download method provided by this embodiment, the replacement instruction is carried in the fanout command delivered by the device management server and the software identifier in the fanout command is replaced with the software local download address, so that each terminal can download data of the software by using a local storage function provided by the device management gateway, so as to effectively prevent multiple terminals from directly retrieving the data externally, thereby significantly improving the efficiency. Particularly, in the situation that some internal network terminals are unable to access an external network, successful management on devices can be ensured.

Figure 2:
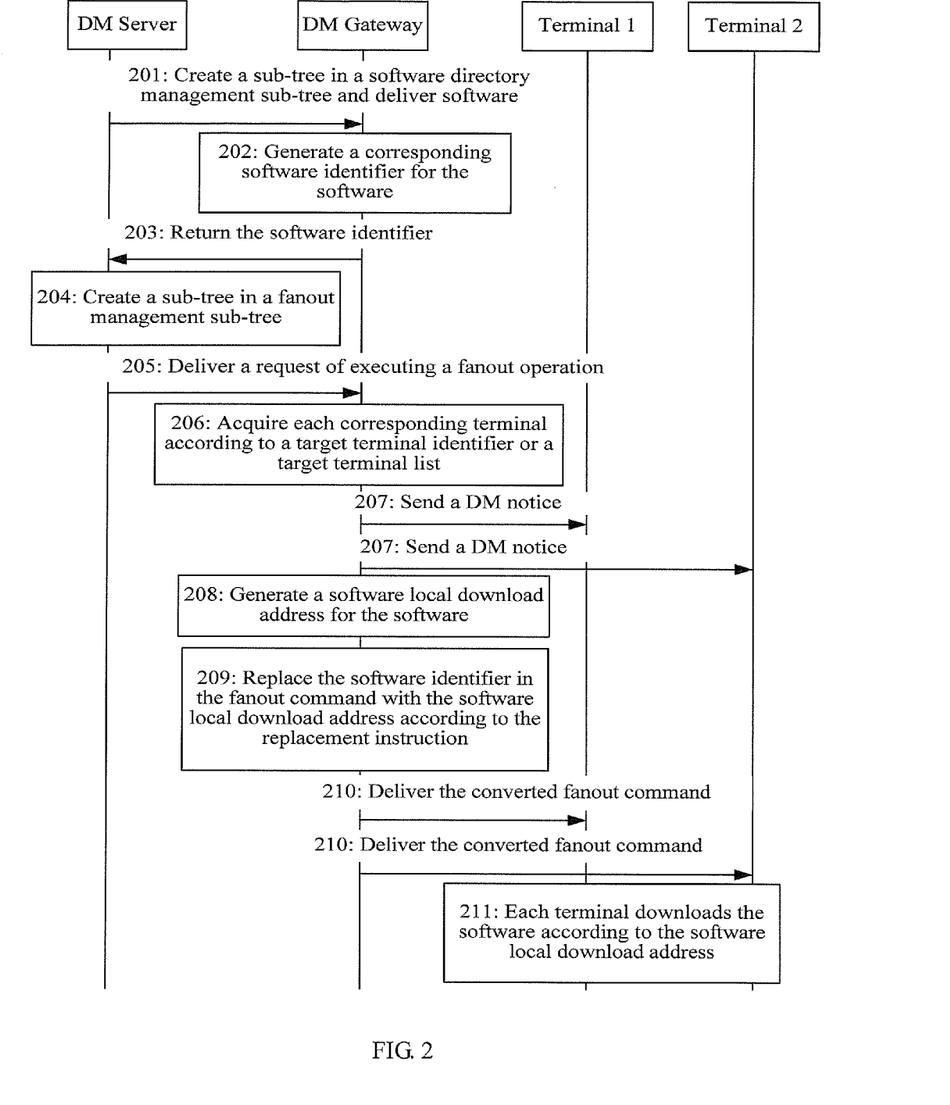
FIG. 2 is a signaling diagram of Embodiment 2 of a software download method of the present invention.

FIG. 2 is a signaling diagram of Embodiment 2 of a software download method of the present invention. As shown in FIG. 2, this embodiment provides a software download method. This embodiment is directed to a situation that a device management gateway is used as a relay management device between a device management server and a terminal. This embodiment may specifically include the following steps.

Step 201: A device management server creates a sub-tree in a software directory management sub-tree and delivers software to a device management gateway.

Figure 3:
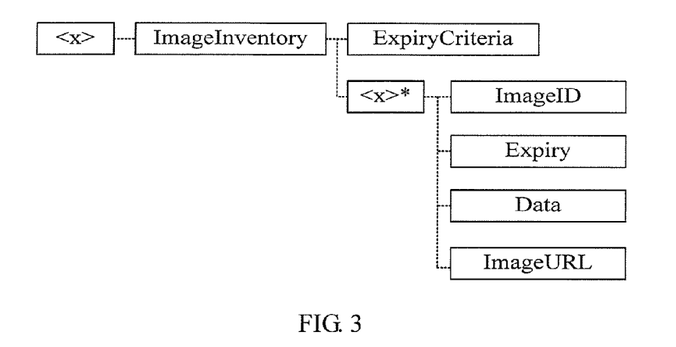
FIG. 3 is a schematic structural diagram of a software directory management sub-tree in Embodiment 2 of the software download method of the present invention.

FIG. 3 is a schematic structural diagram of the software directory management sub-tree in Embodiment 2 of the software download method of the present invention. The device management server creates the sub-tree in the software directory management sub-tree, configures a software remote download address (ImageURL) in the software directory management sub-tree for the device management gateway to download the software corresponding to the software remote download address, or directly delivers the software to a data (Data) node. As shown in FIG. 3, in the sub-tree of the software directory management sub-tree in this embodiment, a default expiry time (ExipryCriteria) node, an expiry time (Expiry) node, a software remote download address (ImageURL) node, and a software data (Data) node can be generated. ExipryCriteria represents the default expiry time for caching the software, and may be specifically set by a DM Gateway; ImageID represents a software identifier; Expiry represents the expiry time set by the device management server, where a value of Expiry must be less than or equal to the default expiry time; ImageURL represents an external network download address corresponding to the software, where the device management server can require the DM Gateway to download the software according to ImageURL and to cache the software locally; and Data represents data of the software, where a DM server can directly use an update command to deliver the software to the device management gateway. The device management server in this embodiment can directly deliver the software to the device management gateway. Alternatively, the device management server may also deliver a download address of the software to the device management gateway, where the download address is a software remote download address of the device management gateway, and the device management gateway downloads the software according to the software remote download address. The device management gateway in this embodiment provides a local storage function to cache the acquired software.

Step 202: The device management gateway generates a software identifier for corresponding to the software.

After acquiring the software from the software remote download address and caching the software, the device management gateway allocates the software identifier to the software that is locally cached. In this case, the device management gateway may also allocate a local download address to the cached software and save the cached software locally, that is, allocate a storage space on the device management gateway or another storage server in a local network of the device management gateway to the software.

Step 203: The device management gateway returns the software identifier to the device management server.

The device management gateway returns the generated software identifier of the software to the device management server, for the device management server to create a sub-tree in a fanout management sub-tree in the subsequent step 204.

Step 204: The device management server creates a sub-tree in the fanout management sub-tree, and configures a fanout command, a target terminal group identifier or a target terminal list, and a replacement instruction.

Figure 4:
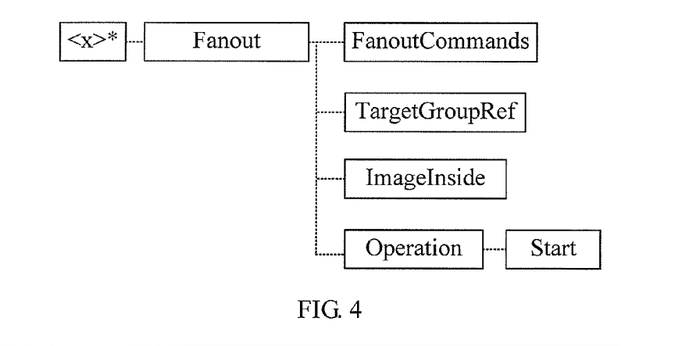
FIG. 4 is a schematic structural diagram of a fanout management sub-tree in Embodiment 2 of the software download method of the present invention.

The device management server creates the sub-tree in the fanout management sub-tree and configures the fanout command, the target terminal group identifier, and the replacement instruction. Here, the configuration operation may be a creation or update operation. When the sub-tree exists, content of the sub-tree is directly updated; when the sub-tree does not exist, the sub-tree needs to be created. FIG. 4 is a schematic structural diagram of the fanout management sub-tree in Embodiment 2 of the software download method of the present invention. As shown in FIG. 4, this step is to generate a node corresponding to the fanout command (FanoutCommands) and a node corresponding to the target terminal group identifier (TargetGroupRef) or the target terminal list in the fanout management sub-tree, and to newly add a node corresponding to the replacement instruction (ImageInside) in the fanout management sub-tree. The fanout command carries the software identifier, the target terminal group identifier or the target terminal list is acquired locally by the device management server according to a specific situation. Multiple target terminal groups are already saved on the device management server, and the target terminal group identifier or the target terminal list may be directly acquired by the device management server according to requirements.

Step 205: The device management server delivers a request of executing a fanout operation to the device management gateway.

The device management server can deliver the request of executing the fanout operation to the device management gateway, so as to request the device management gateway to execute a fanout operation. Specifically, the device management server delivers an execution command to a fanout operation start node (Start) in a fanout command sub-tree, so as to request the device management gateway to execute the fanout operation.

Step 206: The device management gateway acquires each corresponding terminal according to the target terminal identifier or the target terminal list.

The device management gateway obtains, according to the acquired target terminal identifier, a terminal list corresponding to the target terminal identifier, where the terminal list is a list of terminals that need to download the software; and acquires each corresponding terminal through the terminal list. Alternatively, the device management gateway directly acquires each corresponding terminal according to the target terminal list.

Step 207: The device management gateway sends a DM notification to each terminal in the terminal list, so as to establish a DM session with each terminal.

After obtaining the corresponding terminal list, the device management gateway sends the DM notification to each terminal in the terminal list, and wakes the terminal up according to the DM notification, so as to establish a DM management session between the device management gateway and each terminal.

Step 208: The device management gateway generates a software local download address for the software.

The device management gateway acquires, according to the acquired fanout command, the software identifier carried in the fanout command, and generates the software local download address for the software in the local network of the device management gateway according to the software identifier, that is, allocates a storage space on the device management gateway or another storage server in the local network of the device management gateway to the software, and generates the corresponding local download address. Alternatively, in this embodiment, the software local download address may also be generated in step 202, and in this case, step 208 may be omitted.

Step 209: The device management gateway replaces the software identifier in the fanout command with the software local download address according to the replacement instruction.

According to the acquired replacement instruction, the device management gateway performs conversion processing on the acquired fanout command, replaces the software identifier carried in the acquired fanout command with the generated software local download address, and generates a converted fanout command.

Step 210: The device management gateway delivers the converted fanout command to each terminal.

The device management gateway delivers the converted fanout command to each terminal, and the fanout command carries the software local download address.

Step 211: Each terminal downloads the software according to the software local download address.

Specifically, this embodiment may be implemented through the following program:

```
<Add>
    <CmdID>1</CmdID>
    <Item>
        <Target><LocURI>GWMO/Fanout/FanoutCommands</LocURI></Target>
        <Data>
            <![CDATA[
                <Add>
                    <CmdID>1</CmdID>
                    <Item>
                        <Target><LocURI>SCOMO/Download/Pkg1</LocURI></Target>
                    </Item>
                </Add>
                <Add>
                    <CmdID>2</CmdID>
                    <Item>
                        <Target><LocURI>SCOMO/Download/Pkg1/PkgID</LocURI></Target>
                        <Data>Package123</Data>
                    </Item>
                </Add>
                <Add>
                    <CmdID>3</CmdID>
                    <Item>
                        <Target><LocURI>SCOMO/Download/PkgURL</LocURI></Target>
                        <Data>imageID123</Data>
                    </Item>
                </Add>
            ]]>---Commands in <![CDATA[. . . ]] correspond to fanout commands
(FanoutCommands) to be fanned out.
        </Data>
    </Item>
</Add>
<Add>
    <CmdID>2</CmdID>
    <Item>
        <Target><LocURI>GWMO/Fanout/TargetGroupRef</LocURI></Target>
        <Data>Group1</Data>---This is a target terminal group identifier of the fanout command.
    </Item>
</Add>
<Add>
    <CmdID>3</CmdID>
    <Item>
        <Target><LocURI>GWMO/Fanout/ImageInside</LocURI></Target>---This is a replacement instruction.
        <Data>True</Data>
    </Item>
</Add>
<Exec>
    <CmdID>3</CmdID>
    <Item>
        <Target>
            <LocURI>. /GWMO/Fanout/Operations/Start</LocURI>--This is a process of requesting executing a fanout operation.
        </Target>
    </Item>
</Exec>
```

With the software download method provided by this embodiment, the replacement instruction is carried in the fanout command delivered by the device management server and the software identifier in the fanout command is replaced with the software local download address, so that each terminal can download data of the software by using the local storage function provided by the device management gateway, so as to effectively prevent multiple terminals from directly retrieving the data externally, thereby significantly improving the efficiency. Particularly, in the situation that some internal network terminals are unable to access an external network, successful management on devices can be ensured.

Figure 5:
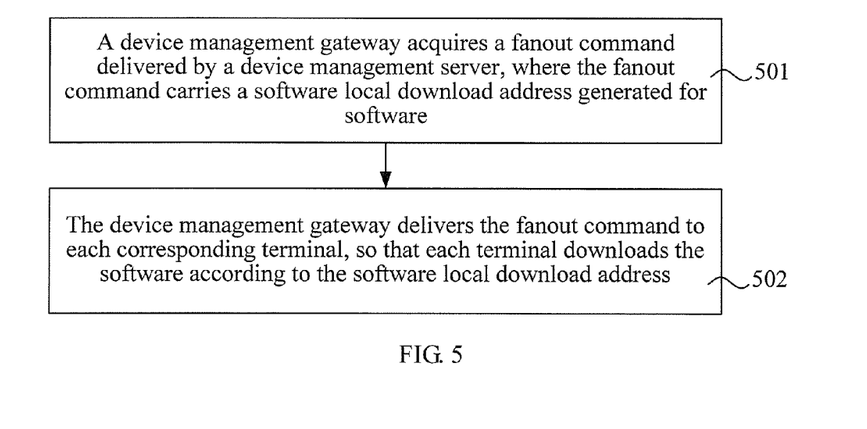
FIG. 5 is a flow chart of Embodiment 3 of a software download method of the present invention.

FIG. 5 is a flow chart of Embodiment 3 of a software download method of the present invention. As shown in FIG. 5, this embodiment provides a software download method. This embodiment is directed to a situation that a device management gateway is used as a relay management device between a device management server and a terminal. This embodiment may specifically include the following steps.

Step 501: A device management gateway acquires a fanout command delivered by a device management server, where the fanout command carries a software local download address generated for software.

In this embodiment, the device management gateway acquires the fanout command from the device management server, where the fanout command carries the software local download address, and the software local download address is generated for the software by the device management gateway. In this embodiment, the software local download address generated for the software may be a local storage address of the device management gateway, and may also be an address of another storage server in a local network of the device management gateway. A main difference between this embodiment and Embodiment 1 is that, the device management gateway generates the software local download address first and returns the software local download address to the device management server, and the device management server directly carries the software local download address in the fanout command for delivery.

Step 502: The device management gateway delivers the fanout command to each corresponding terminal, so that each terminal downloads the software according to the software local download address.

After acquiring the fanout command delivered by the device management server, the device management gateway does not need to parse the fanout command, and directly forwards the fanout command to each corresponding terminal. Each terminal can download the software from the local network of the device management gateway according to the software local download address carried in the fanout command, and does not need to access a remote file server.

With the software download method provided by this embodiment, the software local download address generated for the software by the device management gateway is directly carried in the fanout command delivered by the device management server, so that each terminal can utilize a local storage function provided by the device management gateway to directly acquire download data of the software from the local network of the device management gateway, so as to effectively prevent multiple terminals from directly retrieving the data externally, thereby significantly improving the efficiency. Particularly, in the situation that some internal network terminals are unable to access an external network, successful management on devices can be ensured.

Figure 6:
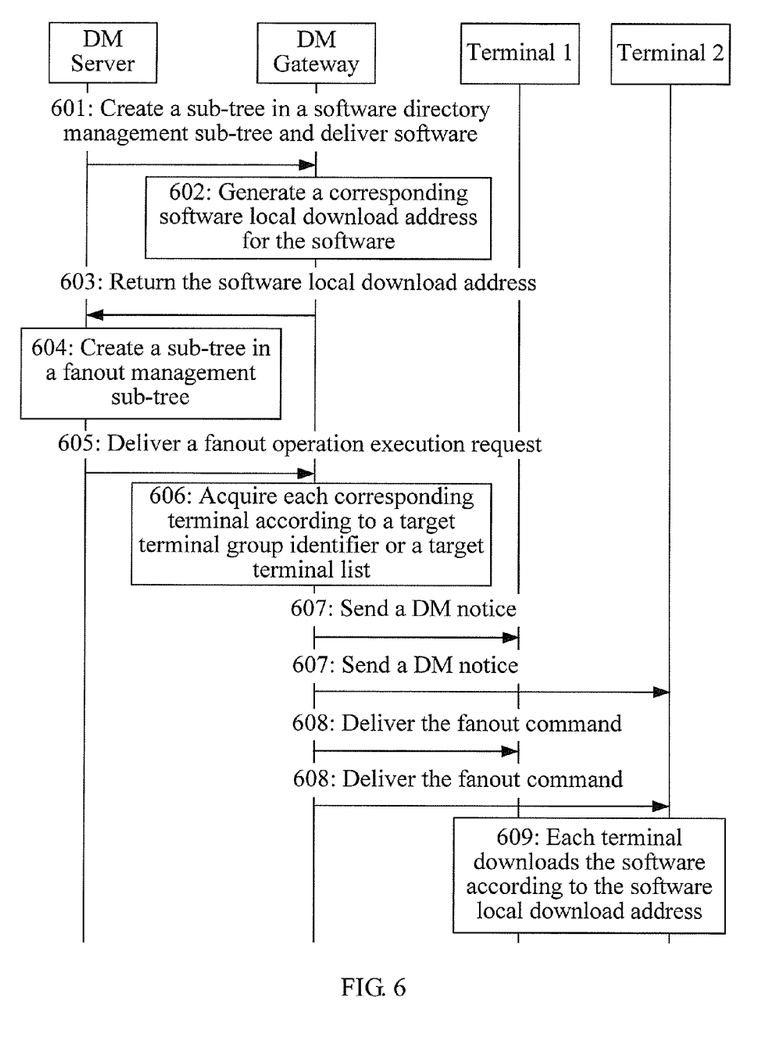
FIG. 6 is a signaling diagram of Embodiment 4 of a software download method of the present invention.

FIG. 6 is a signaling diagram of Embodiment 4 of a software download method of the present invention. As shown in FIG. 6, this embodiment provides a software download method. This embodiment is directed to a situation that a device management gateway is used as a relay management device between a device management server and a terminal. This embodiment may specifically include the following steps.

Step 601: A device management server creates a sub-tree in a software directory management sub-tree, delivers software to a device management gateway and caches the software. This step may be similar to step 201, and details are not described here again.

Step 602: The device management gateway generates a corresponding software local download address for the software.

The device management gateway allocates a local download address to the cached software and saves the cached software locally, that is, allocates a storage space on the device management gateway or another storage server in a local network of the device management gateway to the software.

Step 603: The device management gateway returns the software local download address to the device management server.

Step 604: The device management server creates a sub-tree in a fanout management sub-tree, and configures a fanout command and a target terminal group identifier or a target terminal list, where the fanout command carries the software local download address.

The device management server creates the sub-tree in the fanout management sub-tree and configures the fanout command and the target terminal group identifier. Here, the configuration operation may be a creation or update operation. When the sub-tree exists, content of the sub-tree is directly updated; when the sub-tree does not exist, the sub-tree needs to be created. The fanout command carries the generated software local download address. The target terminal group identifier or the target terminal list is acquired locally by the device management server according to a specific situation. Multiple target terminal groups are already saved on the device management server, and the target terminal group identifier or the target terminal list may be directly acquired by the device management server according to requirements.

Figure 7:
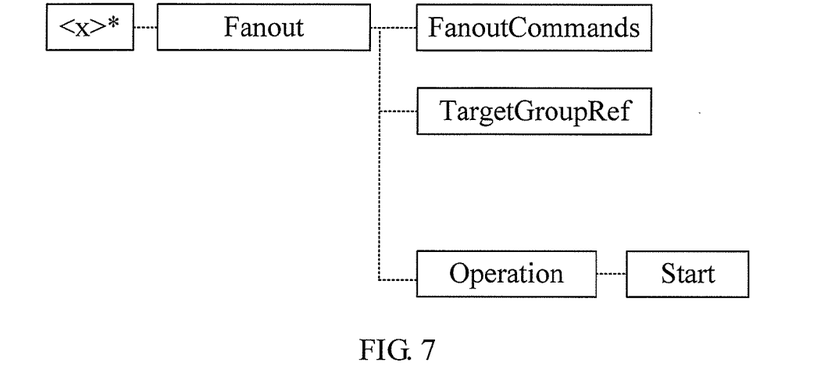
FIG. 7 is a schematic structural diagram of a fanout management sub-tree in Embodiment 4 of the software download method of the present invention.
Figure 8:
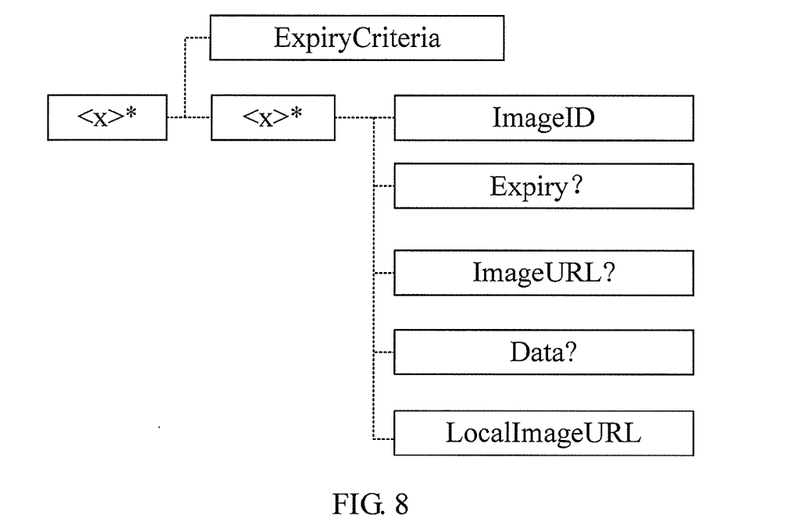
FIG. 8 is a schematic structural diagram of a software directory management sub-tree in Embodiment 4 of the software download method of the present invention.

FIG. 7 is a schematic structural diagram of the fanout management sub-tree in Embodiment 4 of the software download method of the present invention. As shown in FIG. 7, this step is to generate a node corresponding to the fanout command (FanoutCommands) and a node corresponding to the target terminal group identifier (TargetGroupRef) or the target terminal list in the fanout Fanout management sub-tree, where the fanout command carries the software local download address. FIG. 8 is a schematic structural diagram of the software directory management sub-tree in Embodiment 4 of the software download method of the present invention. As shown in FIG. 8, in the sub-tree of the software directory management sub-tree in this embodiment, a default expiry time (ExipryCriteria) node, an expiry time (Expiry) node, a software remote download address (ImageURL) node, a software data (Data) node, a software local download address (LocalImageURL) and so on may be generated. ExipryCriteria represents the default expiry time for caching the software, which may be specifically set by a DM Gateway; ImageID represents a software identifier; Expiry represents the expiry time set by the device management server, where a value of Expiry must be less than or equal to the default expiry time; ImageURL represents an external network download address corresponding to the software, where the device management server can require the DM Gateway to download the software according to ImageURL and to cache the software locally; Data represents data of the software, where a DM server can directly use an update (Replace) command to deliver the software to the device management gateway; and LocalImageURL represents a software local download address allocated by the device management gateway to a file after the file is received by the device management gateway. The device management server must use the local download address in the subsequent FanoutCommands; after the local download address is delivered to a terminal, the terminal downloads the software locally according to the address.

Step 605: The device management server delivers a request of executing a fanout operation to the device management gateway. This step may be similar to step 205 and details are not described here again.

Step 606: The device management gateway acquires each corresponding terminal according to the target terminal group identifier or the target terminal list. This step may be similar to step 206 and details are not described here again.

Step 607: The device management gateway sends a DM notification to each terminal in the terminal list, so as to establish a DM session with each terminal. This step may be similar to step 205 and details are not described here again.

Step 608: The device management gateway delivers the fanout command to each corresponding terminal, where the fanout command carries the software local download address.

Step 609: Each terminal downloads the software according to the software local download address.

Specifically, this embodiment may be implemented through the following program:

```
<Add>
    <CmdID>1</CmdID>
    <Item>
        <Target><LocURI>GWMO/Fanout/FanoutCommands</LocURI></Target>
        <Data>
          <![CDATA[
        <Add>
                <CmdID>1</CmdID>
                <Item>
                    <Target><LocURI>SCOMO/Download/Pkg1</LocURI></Target>
                </Item>
            </Add>
            <Add>
                <CmdID>2</CmdID>
                <Item>
                    <Target><LocURI>SCOMO/Download/Pkg1/PkgID</LocURI></Targ
et>
                    <Data>Package123</Data>
                </Item>
            </Add>
            <Add>
                <CmdID>3</CmdID>
                <Item>
                    <Target><LocURI>SCOMO/Download/PkgURL</LocURI></Target>
                    <Data>http://localhost/scomo/package1eID123</Data>---Loc
al download address
                </Item>
            </Add>
        ]]> --in <![CDATA[. . ]] is a fanout command.
        </Data>
    </Item>
</Add>
<Add>
    <CmdID>2</CmdID>
    <Item>
        <Target><LocURI>GWMO/Fanout/TargetGroupRef</LocURI></Target>
        <Data>Group1</Data>--Target terminal group identifier
    </Item>
</Add>
<Exec>
        <CmdID>3</CmdID>
        <Item>
            <Target>
                <LocURI>. /GWMO/Fanout/Operations/Start</LocURI>---This
is a process of requesting executing a fanout operation.
            </Target>
        </Item>
</Exec>
```

With the software download method provided by this embodiment, the software local download address generated for the software by the device management gateway is directly carried in the fanout command delivered by the device management server, so that each terminal can utilize a local storage function provided by the device management gateway to directly acquire download data of the software from the local network of the device management gateway, so as to effectively prevent multiple terminals from directly retrieving the data externally, thereby significantly improving the efficiency. Particularly, in the situation that some internal network terminals are unable to access an external network, successful management on devices can be ensured.

Persons of ordinary skill in the art may understand that all or part of the steps of the method embodiments may be implemented by a program instructing relevant hardware. The program may be stored in a computer readable storage medium. When the program runs, the above steps of the method embodiments are performed. The storage medium may be any medium capable of storing program codes, such as ROM, RAM, magnetic disk, or optical disk.

Figure 9:
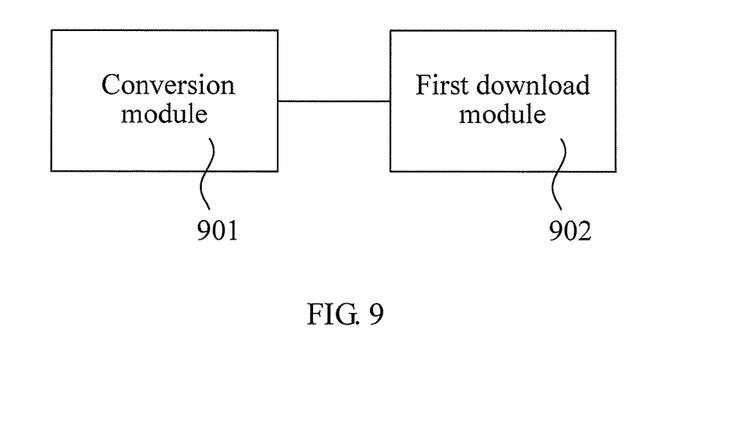
FIG. 9 is a schematic structural diagram of Embodiment 1 of a software download apparatus of the present invention.

FIG. 9 is a schematic structural diagram of Embodiment 1 of a software download apparatus of the present invention. As shown in FIG. 9, this embodiment provides a software download apparatus, capable of specifically performing each step in Embodiment 1 of the method described in the foregoing, and details are not described here again. The software download apparatus provided by this embodiment may specifically include a conversion module 901 and a first download module 902. The conversion module 901 is configured to acquire a fanout command and a replacement instruction that are delivered by a device management server, and replace, according to the replacement instruction, a software identifier in the fanout command with a software local download address generated for software. The first download module 902 is configured to deliver the converted fanout command to each corresponding terminal, so that each terminal downloads the software according to the software local download address.

Figure 10:
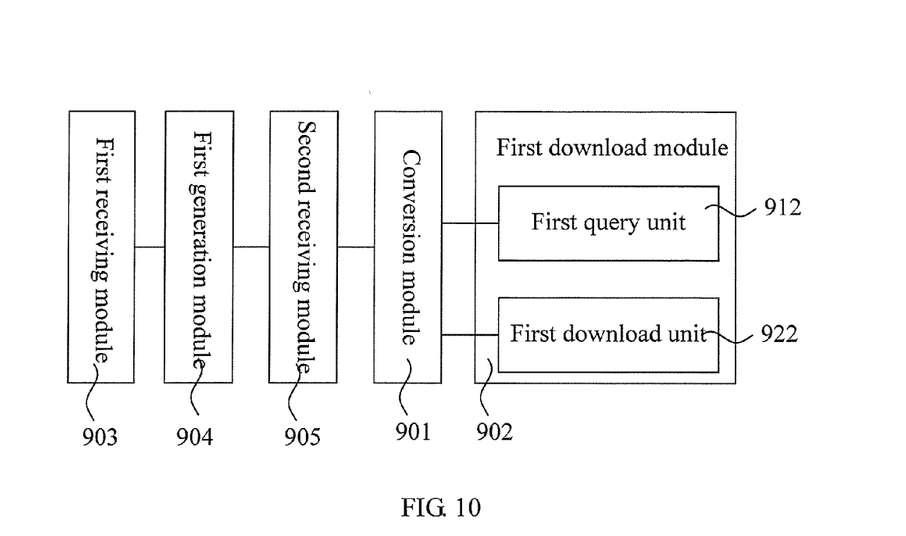
FIG. 10 is a schematic structural diagram of Embodiment 2 of a software download apparatus of the present invention.

FIG. 10 is a schematic structural diagram of Embodiment 2 of the software download apparatus of the present invention. As shown in FIG. 10, this embodiment provides a software download apparatus, capable of specifically performing each step in Embodiment 2 of the method described in the foregoing, and details are not described here again. Based on the apparatus shown in FIG. 9, the software download apparatus provided by this embodiment further includes a first receiving module 903 and a first generation module 904. The first receiving module 903 is configured to receive the software delivered by the device management server, or receive a software download address delivered by the device management server and download the software according to the software download address. The first generation module 904 is configured to generate a corresponding software identifier for the software.

Furthermore, the software download apparatus provided by this embodiment may further include a second receiving module 905. The second receiving module 905 is configured to receive a request of executing a fanout operation, where the request is delivered by the device management server. The device management server configures a node corresponding to the fanout command, a node corresponding to a target terminal group identifier or a target terminal list, and a node corresponding to the replacement instruction in a fanout management sub-tree.

Furthermore, the first download module 902 in this embodiment may specifically include a first query unit 912 and a first download unit 922. The first query unit 912 is configured to acquire each corresponding terminal according to the target terminal group identifier or the target terminal list and send a device management notification to each terminal, so as to establish a device management session with each terminal. The first download unit 922 is configured to deliver the converted fanout command to each terminal through the established device management session.

With the software download apparatus provided by this embodiment, the replacement instruction is carried in the fanout command delivered by the device management server and the software identifier in the fanout command is replaced with the software local download address, so that each terminal can download data of the software by using a local storage function provided by the device management gateway, so as to effectively prevent multiple terminals from directly retrieving the data externally, thereby significantly improving the efficiency. Particularly, in the situation that some internal network terminals are unable to access an external network, successful management on devices can be ensured.

Figure 11:
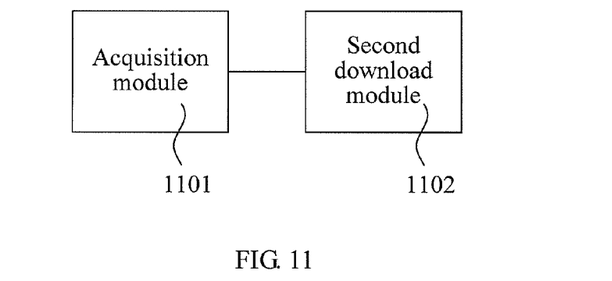
FIG. 11 is a schematic structural diagram of Embodiment 3 of a software download apparatus of the present invention.

FIG. 11 is a schematic structural diagram of Embodiment 3 of the software download apparatus of the present invention. As shown in FIG. 11, this embodiment provides a software download apparatus, capable of specifically performing each step in Embodiment 3 of the method described in the foregoing, and details are not described here again. The software download apparatus provided by this embodiment may specifically include an acquisition module 1101 and a second download module 1102. The acquisition module 1101 is configured to acquire a fanout command delivered by a device management server, where the fanout command carries a software local download address generated for software. The second download module 1102 is configured to deliver the fanout command to each corresponding terminal, so that each terminal downloads the software according to the software local download address.

Figure 12:
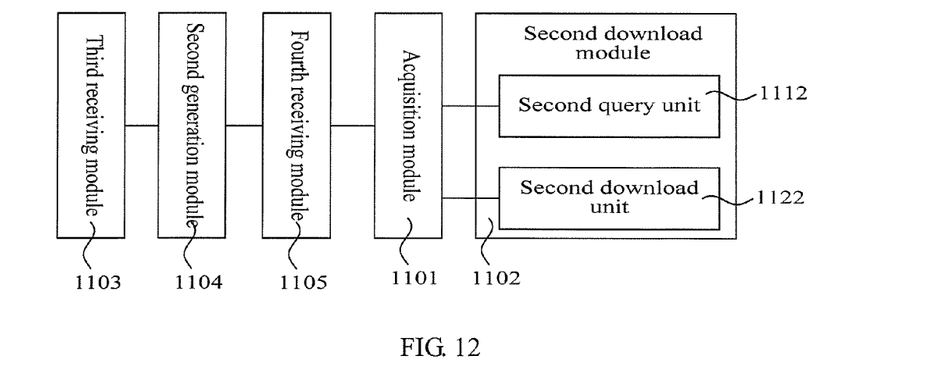
FIG. 12 is a schematic structural diagram of Embodiment 4 of a software download apparatus of the present invention.

FIG. 12 is a schematic structural diagram of Embodiment 4 of the software download apparatus of the present invention. As shown in FIG. 12, this embodiment provides the software download apparatus, capable of specifically performing each step in Embodiment 4 of the method described in the foregoing, and details are not described here again. Based on the apparatus shown in FIG. 11, the software download apparatus provided by this embodiment may further include a third receiving module 1103 and a second generation module 1104. The third receiving module 1103 is configured to the receive software delivered by the device management server, or receive a software download address delivered by the device management server and download the software according to the software download address. The second generation module 1104 is configured to generate the corresponding software local download address for the software.

Furthermore, the software download apparatus provided by this embodiment may further include a fourth receiving module 1105. The fourth receiving module 1105 is configured to receive a request of executing a fanout operation, where the request is delivered by the device management server. The device management server configures a node corresponding to the fanout command and a node corresponding to a target terminal group identifier or a target terminal list in a fanout management sub-tree.

Specifically, the second download module 1102 in this embodiment may specifically include a second query unit 1112 and a second download unit 1122. The second query unit 1112 is configured to acquire each corresponding terminal according to the target terminal group identifier or the target terminal list and send a device management notification to each terminal, so as to establish a device management session with each terminal. The second download unit 1122 is configured to deliver the converted fanout command to each terminal through the established device management session.

With the software download apparatus provided by this embodiment, the software local download address generated for the software by the device management gateway is directly carried in the fanout command delivered by the device management server, so that each terminal can utilize a local storage function provided by the device management gateway to directly acquire download data of the software from the local network of the device management gateway, so as to effectively prevent multiple terminals from directly retrieving the data externally, thereby significantly improving the efficiency. Particularly, in the situation that some internal network terminals are unable to access an external network, successful management on devices can be ensured.

For the specific processes of implementing the method embodiments of the present invention by the relevant apparatuses of the embodiments of the present invention, reference may be made to relevant description of the method embodiments of the present invention, and details are not described here again.

Finally, it should be noted that the above embodiments are merely intended for describing the technical solutions of the present invention, but not intended to limit the present invention. Although the present invention is described in detail with reference to the foregoing embodiments, persons of ordinary skill in the art should understand that modifications can still be made to the technical solutions described in the foregoing embodiments or equivalent substitutions can still be made to some technical features thereof, and such modifications or substitutions cannot make the essence of the corresponding technical solutions depart from the spirit and scope of the technical solutions of the embodiments of the present invention.

What is claimed is:

1. A software download method, comprising:
receiving, by a device management (DM) gateway, a request of executing a fanout operation from a DM server, wherein the request of executing a fanout operation carries a software local download address generated for a software and a target terminal group identifier; and
delivering, by the DM gateway, a fanout command to each corresponding terminal in a target terminal group, wherein the fanout command carries the software local download address and the fanout command causes the terminal to download the software according to the software local download address.

2. The method according to claim 1, further comprising:
receiving, by the DM gateway, a software delivered by the DM server, or receiving a software download address delivered by the DM server and downloading, by the DM gateway, the software according to the software download address;
generating, by the DM gateway, a corresponding software local download address for the software; and
returning, by the DM gateway, the software local download address to the DM server.

3. The method according to claim 2, wherein delivering the fanout command to each corresponding terminal comprises:
acquiring, according to the target terminal group identifier or a target terminal list, each corresponding terminal and sending a device management notification to each terminal, to establish a device management session with each terminal; and
delivering the fanout command to each terminal through the established device management session.

4. A software download method, comprising:
receiving a software delivered by a device management (DM) server, or receiving a software download address delivered by the DM server and downloading the software according to the software download address; and
generating a corresponding software local download address for the software;
returning the software local download address to the DM server;
acquiring a fanout command delivered by the DM server, wherein the fanout command carries the software local download address generated for the software; and
delivering the fanout command to each corresponding terminal to cause the terminal to download the software according to the software local download address.

5. The method according to claim 4, further comprising:
receiving a request of executing a fanout operation delivered by the device management server, wherein the device management server configures a node corresponding to the fanout command and a node corresponding to a target terminal group identifier or a target terminal list in a fanout command sub-tree.

6. The method according to claim 5, wherein delivering the fanout command to each corresponding terminal comprises:
acquiring, according to the target terminal group identifier or the target terminal list, each corresponding terminal and sending a device management notification to each terminal, to establish a device management session with each terminal; and
delivering the fanout command to each terminal through the established device management session.

7. A device management (DM) gateway, comprising:
a processor; and
memory coupled to the processor comprising instructions that, when executed by the processor, cause a download process between the DM gateway and a plurality of terminals, causing the DM gateway to:
acquire a fanout command delivered by a DM server, wherein the fanout command carries a software local download address generated for software; and
deliver the fanout command to each corresponding terminal to enable the terminal downloading the software according to the software local download address.

8. The DM gateway according to claim 7, further comprising instructions that, when executed by the processor, cause the DM gateway to:
receive the software delivered by the device management server, or receive a software download address delivered by the device management server and download the software according to the software download address; and
generate the corresponding software local download address for the software.

9. The DM gateway according to claim 7, further comprising instructions that, when executed by the processor, cause the DM gateway to:
receive a request of executing a fanout operation delivered by the device management server, wherein the device management server configures a node corresponding to the fanout command and a node corresponding to a target terminal group identifier or a target terminal list in a fanout management sub-tree.

10. The DM gateway according to claim 9, further comprising instructions that, when executed by the processor, cause the DM gateway to:
acquire each corresponding terminal according to the target terminal group identifier or the target terminal list and send a device management notification to each terminal, to establish a device management session with each terminal; and
deliver the fanout command to each terminal through the established device management session.

* * * * *